US011847803B2

United States Patent
Zhao et al.

(10) Patent No.: US 11,847,803 B2
(45) Date of Patent: Dec. 19, 2023

(54) HAND TRAJECTORY RECOGNITION METHOD FOR FOLLOWING ROBOT BASED ON HAND VELOCITY AND TRAJECTORY DISTRIBUTION

(71) Applicant: ZHEJIANG UNIVERSITY, Hangzhou (CN)

(72) Inventors: Xinyue Zhao, Hangzhou (CN); Gan Gao, Hangzhou (CN); Zaixing He, Hangzhou (CN); Bolun Zhang, Hangzhou (CN); Shuyou Zhang, Hangzhou (CN); Jianrong Tan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 443 days.

(21) Appl. No.: 17/279,062

(22) PCT Filed: Dec. 27, 2019

(86) PCT No.: PCT/CN2019/128938
§ 371 (c)(1),
(2) Date: Mar. 23, 2021

(87) PCT Pub. No.: WO2020/211447
PCT Pub. Date: Oct. 22, 2020

(65) Prior Publication Data
US 2022/0083770 A1    Mar. 17, 2022

(30) Foreign Application Priority Data
Apr. 17, 2019   (CN) .......................... 201910309591.3

(51) Int. Cl.
*G06V 40/20* (2022.01)
*G06T 7/73* (2017.01)
(Continued)

(52) U.S. Cl.
CPC .............. *G06V 40/28* (2022.01); *G06F 3/017* (2013.01); *G06F 18/2414* (2023.01);
(Continued)

(58) Field of Classification Search
CPC ....... B25J 19/023; B25J 9/0003; G06F 3/017; G06F 18/2414; G06F 18/24147;
(Continued)

(56) References Cited

U.S. PATENT DOCUMENTS

| 6,552,729 B1 | 4/2003 | Di Bernardo et al. |
| 2014/0270382 A1* | 9/2014 | Cheng .................... G06V 40/28 382/104 |

FOREIGN PATENT DOCUMENTS

| CN | 105320937 | 2/2016 |
| CN | 105807926 | 7/2016 |

* cited by examiner

*Primary Examiner* — Manuchehr Rahmjoo
(74) *Attorney, Agent, or Firm* — Jiwen Chen; Joywin IP Law PLLC (57) ABSTRACT

A hand trajectory recognition method for a following robot based on hand velocity and trajectory distribution comprises: sampling and photographing an operator by a kinect camera to obtain hand projection plane data; smoothing the hand projection plane data by moving average, establishing velocity vectors, and processing the velocity vectors to obtain a hand movement descriptor; establishing a hand movement area, traversing hand three-dimensional positions of all frames in an order of sampling and photographing, assigning a mesh where the hand three-dimensional position of each frame is located, and calculating centroid positions of all assigned meshes; establishing centroid directing vectors, and processing the centroid directing vectors to obtain a hand trajectory shape descriptor; and processing cosine values of two angles to obtain a common similarity of the movement descriptor and the trajectory shape descriptor to (Continued)

standard descriptors, and using a standard gesture with a maximum common similarity as a result. The present invention can accurately recognize the class of a gesture, is insensitive to the translation, scaling, rotation and order of hand trajectories, is high in flexibility and can save time and energy.

6 Claims, 7 Drawing Sheets

(51) Int. Cl.
*G06V 40/10* (2022.01)
*G06F 3/01* (2006.01)
*G06T 5/00* (2006.01)
*G06T 17/20* (2006.01)
*G06F 18/2413* (2023.01)
*B25J 9/00* (2006.01)
*B25J 19/02* (2006.01)

(52) U.S. Cl.
CPC ........ *G06F 18/24147* (2023.01); *G06T 5/002* (2013.01); *G06T 7/73* (2017.01); *G06T 17/20* (2013.01); *G06V 40/107* (2022.01); *B25J 9/0003* (2013.01); *B25J 19/023* (2013.01)

(58) Field of Classification Search
CPC ........... G06T 17/20; G06T 5/002; G06T 7/73; G06T 2207/10024; G06T 2207/10028; G06T 2207/30196; G06T 2207/30241; G06T 2207/30252; G06T 7/251; G06V 20/64; G06V 40/107; G06V 40/28
See application file for complete search history.

HAND TRAJECTORY RECOGNITION METHOD FOR FOLLOWING ROBOT BASED ON HAND VELOCITY AND TRAJECTORY DISTRIBUTION

This is a U.S. national stage application of PCT Application No. PCT/CN2019/128938 under 35 U.S.C. 371, filed Dec. 27, 2019 in Chinese, claiming priority to Chinese Patent Application No. 201910309591.3, filed Apr. 17, 2019, all of which are hereby incorporated by reference.

BACKGROUND OF THE INVENTION

1. Technical Field

The present invention relates to the field of posture recognition, in particular to a hand trajectory recognition method for a following robot based on hand velocity and trajectory distribution histograms.

2. Description of Related Art

Following robots have been widely used in people's daily life to assist passengers in delivering luggage or assist specific customers in purchasing. However, the following robots only having a tracking function are not competent enough in actual working environments. The determination and switching of tracked targets, the termination of tracking tasks, and the reception of instructions from the tracked objects in the tracking process put forward the requirement for a human-machine interaction function of the following robots. Remote interaction is limited by some physical instruments and is inconvenient to implement; voice interaction is inapplicable due to the noisy working environments of the following robots, the distance between tracked persons and the following robots, and serious interference from external noises; gesture interaction, as a natural human-machine interaction method, is suitable for the following robots because of its independence of external media, intuitive expressions and remote transmission.

However, the trajectories made by different persons, even by the same person at different times, are quite different, which requires that the gesture interaction technology of the following robots should be able to distinguish hand trajectories. In recent years, many scholars had carried study on hand trajectory recognition. For example, Beh et al., segmented hand trajectories according to the fact whether or not the variation of an angle between two trajectory points exceeds a threshold and modeled the trajectories by means of a Von-Mise distribution-based HMM, which makes the optimal recognition rate of letter and number gestures reach 97.11%. Jingren Tang et al., put forward a structured dynamic time warping method, which divided a continuous trajectory by means of an angle threshold, extracted position and velocity features of a division point by means of a sliding window, detected the velocity decrease by means of an SVM classifier to verify the division accuracy, and recognized the trajectory through a weighted dynamic time planning method. Mahmoud et al., calculated and dispersed the angles between a former point and a latter point of the hand trajectory, established HMM models of gesture trajectories and non-gesture trajectories, and carried out sliding window matching on the continuous trajectory; if a difference between a gesture probability and a non-gesture probability becomes positive from negative, an initial point of a meaningful gesture trajectory is detected; otherwise, an end point is detected; and finally, the meaning of the trajectory between the initial point and the end point is recognized.

It is necessary for all these gesture classification methods to establish a training set including a great deal of data for each action, so the workload in the earlier stage is large. Due to the sensitivity to the time order how the gesture is completed, the gesture should be completed in a set order to realize interaction with a robot, which makes the flexibility unsatisfying. Moreover, the calculation is large, which is not beneficial to the rapidity and puts forward high requirements for hardware.

BRIEF SUMMARY OF THE INVENTION

In view of this, the present invention provides a hand trajectory recognition method for a following robot based on hand velocity and trajectory distribution to solve the problems mentioned in the description of the related art.

According to the present invention, a hand movement trajectory is sampled by a kinect camera and is smoothened. The velocity direction and magnitude information of the trajectory is recorded to form a hand movement velocity descriptor. The distribution direction and magnitude information of trajectory points with respect to the center of gravity of the trajectory is recorded to form a hand trajectory shape descriptor. A standard description of a gesture is given according to a trajectory shape expression or an exemplary template trajectory. The cosine similarities between the velocity descriptor and a standard velocity descriptor as well as between the shape descriptor and a standard shape descriptor are calculated and weighted to obtain a comprehensive similarity which is used as a criterion of the class of the gesture.

Figure 1:
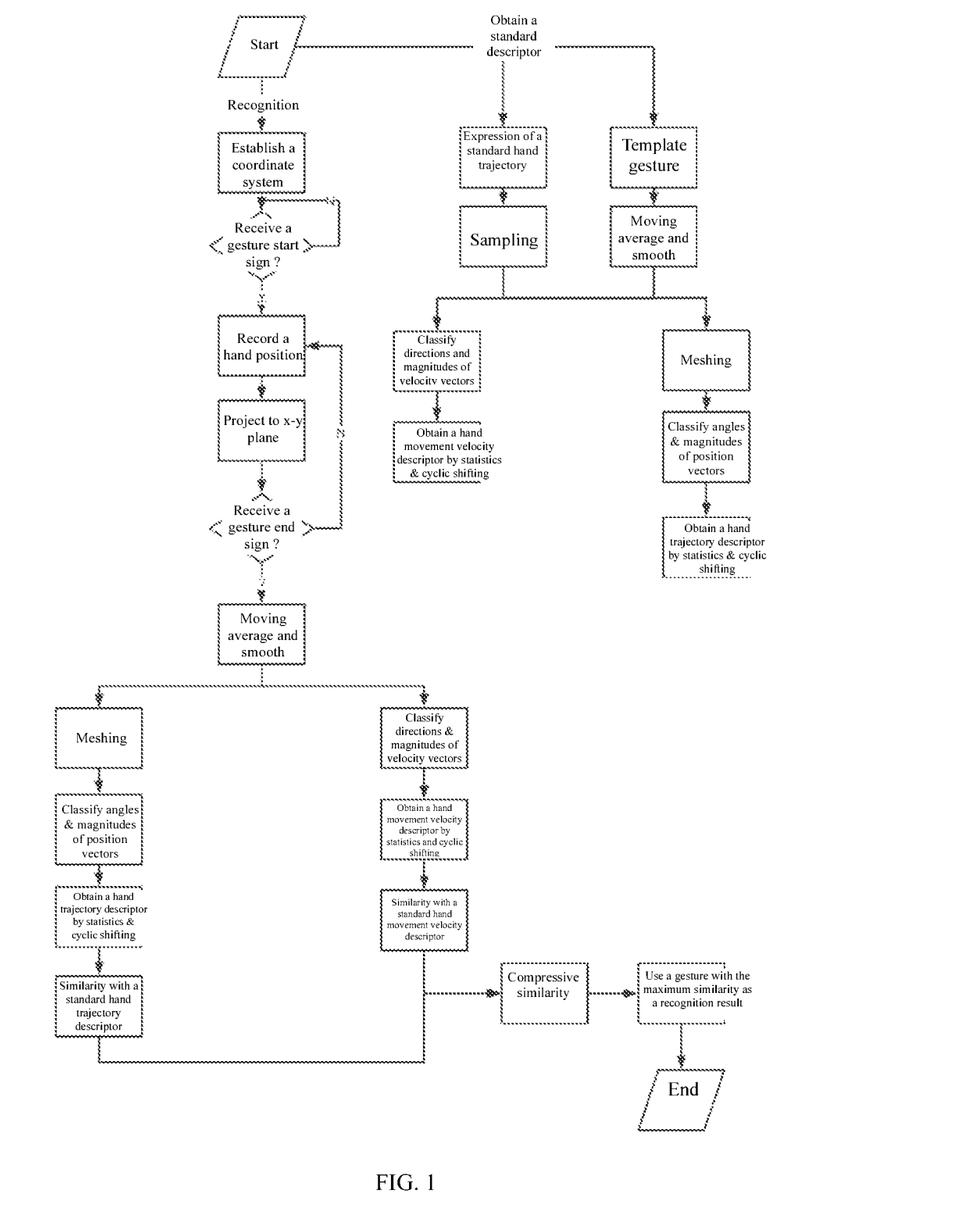
FIG. 1 is a flow diagram of hand trajectory recognition of the present invention.

As shown in FIG. 1, the technical solution adopted by the present invention comprises the following steps:

Step 1: sampling and photographing an operator by a kinect camera to obtain three-dimensional positional information of skeleton joints, establishing a projection plane according to the three-dimensional positional information of the skeleton joints as well as relative positions of the operator and the kinect camera, photographing the operator by the kinect camera to obtain a hand three-dimensional position of a hand of the operator, recording movement data of the hand three-dimensional position in the process from a start sign gesture to an end sign gesture performed by the operator, and projecting the movement data of the three-dimensional position onto the projection plane to obtain hand projection plane data;

In the present invention, the kinect camera and an upper computer are installed on a following robot, four wheels are installed at the bottom of the following robot, continuous gesture images of the operator are obtained by the kinect camera and are sent to the upper computer for processing and judgment, and then, a hand trajectory is recognized.

The hand three-dimensional position is a three-dimensional position of a central point of the hand.

Step 2: smoothing the hand projection plane data by moving average, connecting every two adjacent hand three-dimensional positions by a vector that points from a hand three-dimensional position of a former frame to a hand three-dimensional position of a latter frame, using the vectors as velocity vectors, classifying angles of the velocity vectors into n classes through a neighborhood method, and classifying magnitudes of the velocity vectors into m classes by size, wherein each velocity vector is represented as follows:

$$(q,j), q \le n, j \le m \tag{1}$$

wherein, q is class results of the angles of the velocity vectors obtained through the neighborhood method, and j is class results of the magnitudes of the velocity vectors obtained by size;

In Step 2, classifying the angles of the velocity vectors through the neighborhood method is carried out as follows: initial points of the velocity vectors are moved to an origin of coordinates of the projection plane, a range of all the angles of the velocity vectors between 0° to 360° on the projection plane is divided into n equal regions, and if an end point of one velocity vector lies within the q-th region, a classification result of the angle of this velocity vector obtained through the neighborhood method is q.

In Step 2, classifying the magnitudes of the velocity vectors by size is carried out as follows: the magnitudes of the velocity vectors are divided into m ranges, and if the magnitude of one velocity vector lies within the j-th range, the classification result of the magnitude of this velocity vector is j.

Step 3: processing angle classes and magnitude classes of the velocity vectors to obtain a hand movement vector, and cyclically shifting components in the hand movement vector to obtain a hand movement descriptor; enabling a maximum component to be located at an initial position of the vector by means of cyclic shifting to endow the hand movement descriptor with rotation invariance.

Step 4: establishing a hand movement area around the hand according to the hand projection plane data, meshing the hand movement area, traversing hand three-dimensional positions of all frames in an order of sampling and photographing, assigning a mesh where the hand three-dimensional position of each frame is located, and calculating centroid positions of all assigned meshes.

Step 5: establishing a vector from each centroid position to the corresponding assigned mesh, and using the vector as a centroid directing vector; then, classifying angles and magnitudes of the centroid directing vectors in the same way as the velocity vectors in Step 2, that is, classifying the angles of the centroid directing vectors into multiple classes through the neighborhood method, and classifying the magnitudes of the centroid directing vectors into multiple classes by size; then, processing angle classes and magnitude classes of the centroid directing vectors to obtain a hand shape vector, and cyclically shifting components in the hand shape vector to obtain a hand trajectory shape descriptor; and enabling a maximum component to be located at an initial position of the vector.

Step 6: calculating a cosine value of an angle between the hand movement descriptor and a standard hand movement descriptor, calculating a cosine value of an angle between the hand trajectory shape descriptor and a standard hand trajectory shape descriptor, processing the two cosine values to obtain a common similarity of the movement descriptor and the hand trajectory shape descriptor to standard descriptors, and using a standard gesture with a maximum common similarity as a gesture recognition result.

The standard hand movement descriptor and the standard hand trajectory shape descriptor are both standard descriptors which are obtained as follows: acquiring data by the kinect camera to obtain a standard template gesture, and then obtaining the standard hand movement descriptor and the standard hand trajectory shape descriptor by processing in the above steps.

In Step 2, the movement data of the projected hand three-dimensional positions are smoothed by moving average specifically according to the following formula:

$$P'_i = \frac{P_{i-2} + P_{i-1} + P_i + P_{i+1} + P_{i+2}}{5}, 2 \leq i \leq N-2$$

$$P'_i = \frac{P_{i-1} + P_i + P_{i+1}}{3}, i = 1, N-1$$

$$P'_i = P_i, i = 0, N$$

wherein, $P_i$ is the i-th hand three-dimensional position, $P_i=(x_i, y_i)$, and $x_i, y_i$ are a horizontal coordinate and a vertical coordinate of the i-th hand three-dimensional position on the projection plane, respectively; $P_i'$ is the i-th hand three-dimensional position smoothed by moving average, $P_i'=(x_i', y_i')$, $x_i', y_i'$ are a horizontal coordinate and a vertical coordinate of the i-th hand three-dimensional position, smoothed by moving average, on the projection plane, respectively, $i \leq N$, and N is the total number of hand three-dimensional positions obtained by sampling and photographing.

In Step 3, processing the angle classes and the magnitude classes of the velocity vectors to obtain the hand movement vector is carried out as follows: magnitude classification results of velocity vectors with the same angle classification result are added, and the sum is used as the i-th component of the hand movement vector, wherein "i" is the same as the angle classification result.

Mesh assignment in Step 4 specifically refers to processing the hand three-dimensional position of each frame as the current frame:

4.1: checking the hand three-dimensional positions of the current frame and a former frame; if the hand three-dimensional positions of the two frames are not located in the same mesh and the hand three-dimensional position of the former frame is not located within eight adjacent meshes of a mesh where the hand three-dimensional position of the current frame is located, connecting the hand three-dimensional positions of the two frame through a connecting segment, and assigning meshes where the connecting segment passes, specifically:

4.1.1: calculating the slope of the connecting segment between the hand three-dimensional positions of the two frames on the projection plane, obtaining a coordinate formula of the connecting segment y=kx+b, and assigning a mesh where the hand three-dimensional position of the former frame is located and the mesh where the three-dimensional position of the current frame is located;

4.1.2: from a mesh column where the hand three-dimensional position of the former frame is located, taking a column of meshes adjacent to the mesh direction of the hand three-dimensional position of the current frame as a first mesh column; from a mesh row, where the hand three-dimensional position of the former frame is located, to the mesh where the hand three-dimensional position of the current frame is located, assigning H meshes in the first mesh column, wherein H is an integer value obtained by rounding off the slope of the connecting segment;

4.1.3: then, from the first mesh column, taking a column of meshes close to the mesh direction of the hand three-dimensional position of the current frame as a next mesh column; from a mesh row where a mesh closest to the mesh, where the hand three-dimensional position of the current frame is located after assignment, to the mesh direction of the hand three-dimensional position of the current frame, assigning H' meshes in the next mesh column, wherein the value of H' is obtained as follows: coordinates of the mesh column closest to the mesh, where the hand three-dimensional position of the current frame is located after assignment, are substituted into a coordinate formula of the connecting segment to obtain a vertical coordinate; if a row coordinate is closer to the mesh, where the hand three-dimensional position of the current frame is located, than the vertical coordinate, H' is a maximum integer value smaller than the absolute value of the slope of the connecting segment; or, if the vertical coordinate is closer to the mesh, where the hand three-dimensional position of the current frame is located, than the row coordinate, H' is a minimum integer value greater than the absolute value of the slope of the connecting segment;

4.1.4: repeating Step 4.1.3 until the mesh, where the assigned mesh reaches the mesh where the hand three-dimensional position of the current frame is located;

4.2: constructing a movement trajectory of the gesture center by all assigned meshes, wherein in specific implementation, assignments are added as tags; then, calculating centroid positions of all the assigned meshes, wherein the centroid positions may be decimals.

A method for processing the angle classes and the magnitude classes of the centroid directing vectors to obtain the hand shape vector in the Step 5 is the same as the method of processing the angle classes and the magnitude classes of the velocity vectors to obtain the hand movement vector in the Step 3, that is, magnitude classification results of centroid directing vectors with the same angle classification result are added, and the sum is used as the i-th component of the hand shape vector, wherein "i" is the same as the angle classification result.

In Step 6, the common similarity of the movement descriptor and the trajectory shape descriptor to the standard descriptors is calculated according to the following formula:

$$S_0 = \omega_1 S_1 + \omega_2 S_2$$

wherein, $S_1$ is the similarity of the movement descriptor to the standard descriptor, $S_2$ is the similarity of the trajectory shape descriptor to the standard descriptor, $S_0$ is the common similarity of the movement descriptor and the trajectory shape descriptor to the standard descriptor, $\omega_1$ is the weight of the similarity of the movement descriptor to the standard descriptor in the common similarity of the movement descriptor and the trajectory shape descriptor to the standard descriptor, and $\omega_2$ is the weight of the similarity of the trajectory shape descriptor to the standard descriptor in the common similarity of the movement descriptor and the trajectory shape descriptor to the standard descriptor.

The present invention has the following beneficial effects:

The present invention can accurately recognize the class of a gesture by processing data acquired by a kinect camera, is insensitive to the translation, scaling, rotation and order of hand trajectories, and is high in flexibility.

Training of a great deal of samples is not needed, so that time and energy are saved.

The present invention is high in recognition speed and low in resource consumption.

DETAILED DESCRIPTION OF THE INVENTION

The present invention will be further described in conjunction with the accompanying drawings and embodiments.

Figure 2:
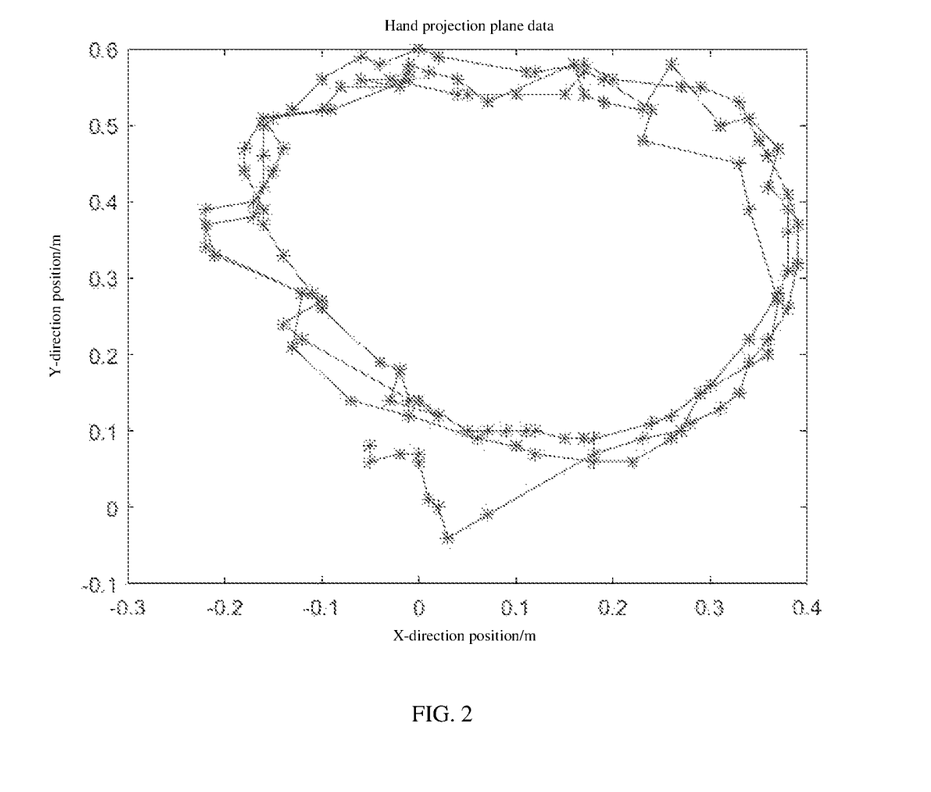
FIG. 2 is a diagram of hand movement positions captured between a start sign and an end sign.

An embodiment and an implementation process thereof of the present invention are as follows:

Step 1: an operator is sampled and photographed by a kinect camera to obtain three-dimensional positional information of skeleton joints, a projection plane is established according to the three-dimensional positional information of the skeleton joints as well as relative positions of the operator and the kinect camera, the operator is photographed by the kinect camera to obtain a hand three-dimensional position of a hand of the operator, movement data of the hand three-dimensional position in the process from a start sign gesture to an end sign gesture performed by the operator is recorded, and the movement data of the three-dimensional position are projected onto the projection plane to obtain hand projection plane data. The hand projection plane data obtain in Step 1 are marked with '*' and are then sequentially connected by lines in a time order, as shown in FIG. 2.

Figure 3:
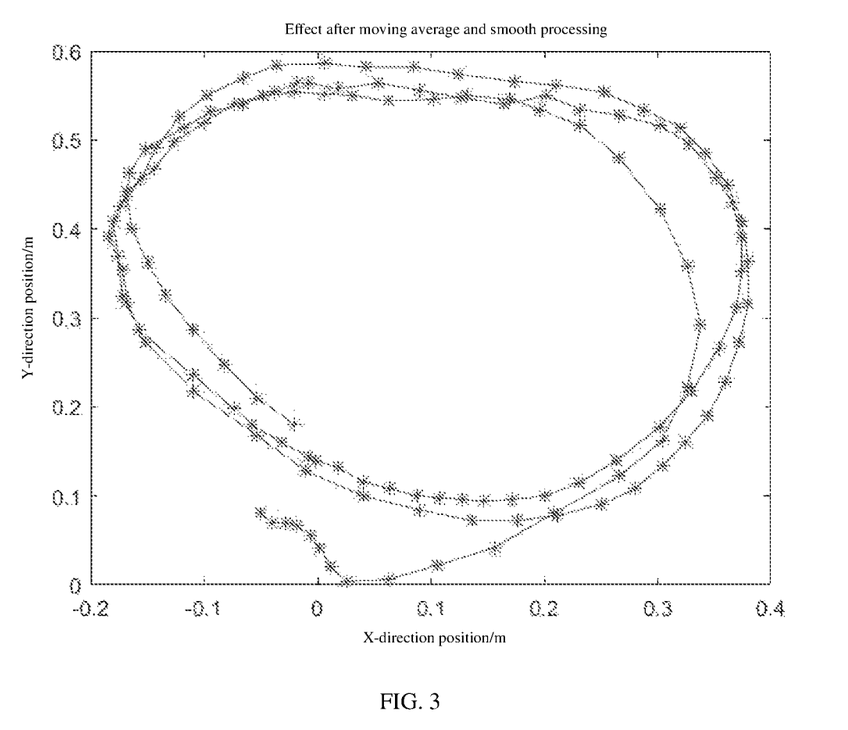
FIG. 3 is an effect diagram of the hand movement positions after moving smoothing and filtering.

Step 2: the hand projection plane data are smoothed by moving average, and an effect after processing is shown in FIG. 3. Every two adjacent hand three-dimensional positions are connected by a vector that points from a hand three-dimensional position of a former frame to a hand three-dimensional position of a latter frame, the vectors are used as velocity vectors, angles of the velocity vectors are classified into n classes through a neighborhood method, and magnitudes of the velocity vectors are classified into m classes by size, wherein each velocity vector is represented as follows:

$$(q, j), q \leq n, j \leq m \quad (1)$$

wherein, q is class results of the angles of the velocity vectors obtained through the neighborhood method, and j is class results of the magnitudes of the velocity vectors obtained by size.

Figure 4:
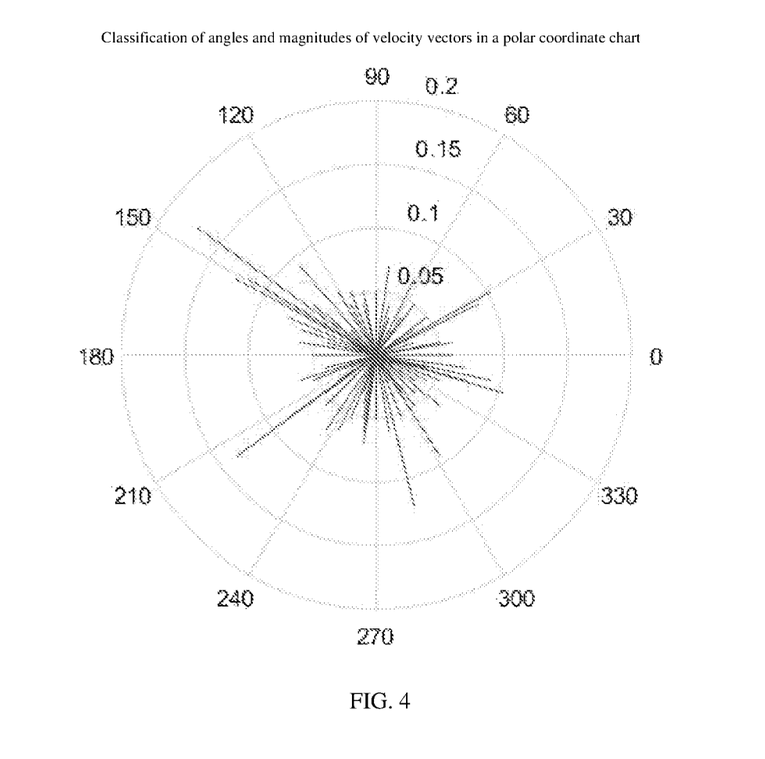
FIG. 4 is a classification effect diagram of angles and magnitudes of velocity vectors in a polar coordinate chart.

In this embodiment, from −22.5°, the velocity vectors are classified into eight classes between 0° to 360° with every 45° as a class from −22.5°; the magnitudes are classified into $m_0$ classes with every 0.01 m as a class, wherein $m_0$ depends on the magnitude of the maximum velocity vector. The criteria of angle classification are shown in Table 1, and the criteria of magnitude classification are shown in Table 2. Initial points of all the velocity vectors are moved to the origin of a polar coordinate chart, as shown in FIG. 4.

TABLE 1

| Criteria of x | Criteria of y | Criteria of y/x | Classes |
|---|---|---|---|
| x > 0 | | −0.414 ≤ y/x < 0.414 | 0 |
| x > 0 | y > 0 | 0.414 ≤ y/x < 2.414 | 1 |
| | y > 0 | 2.414 ≤ y/x ‖ y/x < −2.414 | 2 |
| x < 0 | y > 0 | −2.414 ≤ y/x < −0.414 | 3 |
| x < 0 | | −0.414 ≤ y/x < 0.414 | 4 |
| x < 0 | y < 0 | 0.414 ≤ y/x < 2.414 | 5 |
| | y < 0 | 2.414 ≤ y/x ‖ y/x < −2.414 | 6 |
| x > 0 | y < 0 | −2.414 ≤ y/x < −0.414 | 7 |

TABLE 2

| Criteria | Classes |
|---|---|
| $\sqrt{x^2+y^2} \leq 0.01$ | 1 |
| $0.01 < \sqrt{x^2+y^2} \leq 0.02$ | 2 |
| ... | |
| $0.01 * (n-1) < \sqrt{x^2+y^2} \leq 0.01 * m_0$ | $m_0$ |

Figure 5:
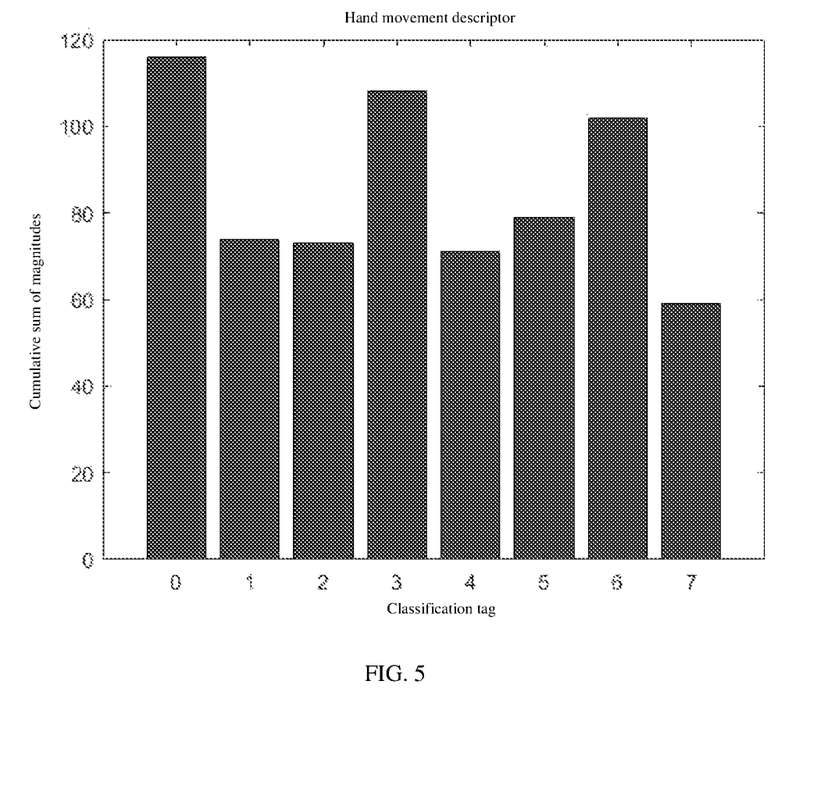
FIG. 5 is a schematic diagram of a hand movement descriptor.

Step 3: angle classes and magnitude classes of the velocity vectors are processed to obtain a hand movement vector, and components in the hand movement vector are cyclically shifted to obtain a hand movement descriptor. The hand movement vector obtained in this step is: [116;74;73;108;71;79;102;59], and the hand movement descriptor is: [116;74;73;108;71;79;102;59]. A histogram corresponding to the hand movement descriptor is shown in FIG. 5.

Figure 6:
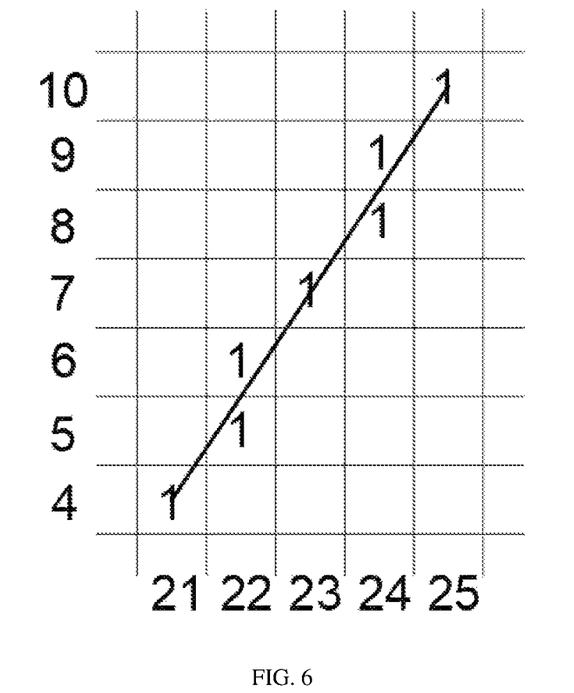
FIG. 6 is a schematic diagram of assignments of meshes where hand three-dimensional positions are located.
Figure 7:
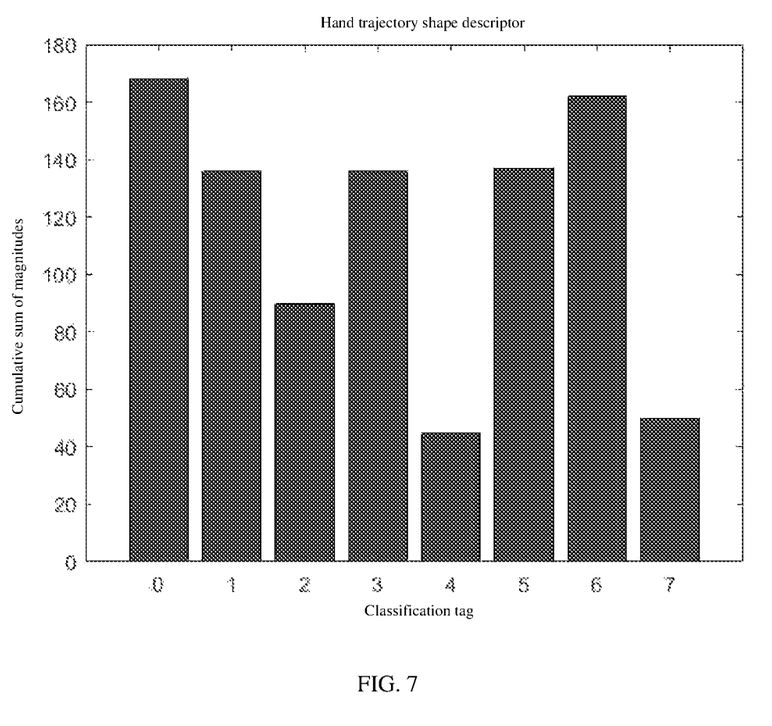
FIG. 7 is a schematic diagram of a hand trajectory shape descriptor.

Step 4: a hand movement area is established around the hand according to the hand projection plane data and is meshed, hand three-dimensional positions of all frames are traversed in an order of sampling and photographing, a mesh, where the hand three-dimensional position of each frame is located, is assigned, and centroid positions of all assigned meshes are calculated. With two points (21, 4) and (25, 10) on the traversing as an example, the assignment process is explained below, as shown in FIG. 3 and FIG. 6.

The slope is calculated $$k_0 = \frac{10-4-1}{25-21-1} = 1.667,$$

a minimum integer greater than the absolute value of the slope is 2, and a maximum integer smaller than the absolute value of the slope is 1. A linear equation is: y=1.667x−31.

A mesh column closest to a mesh, where the hand three-dimensional position of a current frame is located after assignment, it taken as a former mesh column; from the former mesh column, a column of mesh adjacent to the mesh, where the hand three-dimensional position of the current frame is located, is taken as a current mesh column.

TABLE 3

| Mesh columns | Vertical coordinates obtain by substituting the former mesh column into the coordinate formula | Row coordinates closest to the hand three-dimensional position of the current frame in the former column | Assigned rows of the current mesh column | Assigned row coordinates of the current mesh column |
|---|---|---|---|---|
| 22 (first mesh column) | 4 | 4 | 2 | 5, 6 |
| 23 | 5.674 | 6 | 1 | 7 |
| 24 | 7.341 | 7 | 2 | 8, 9 |

The centroid calculation result of all points is: (15.35, 25.75).

Step 5: a vector from each centroid position to the corresponding assigned mesh is established and is used as a centroid directing vector; then, angles and magnitudes of the centroid directing vectors are classified in the same way as the velocity vectors in Step 2; then, angle classes and magnitude classes of the centroid directing vectors are processed to obtain a hand-shaped vector, and components in the hand shape vector are cyclically shifted to obtain a hand trajectory shape descriptor. The hand shape vector obtained in this step is: [45;137;162;50;168;136;90;136], and the hand trajectory shape descriptor is: [168;136;90; 136;45;137;162;50]. A histogram corresponding to the hand trajectory shape descriptor is shown in FIG. 6.

Step 6: a cosine value of an angle between the hand movement descriptor and a standard hand movement descriptor is calculated, a cosine value of an angle between the hand trajectory shape descriptor and a standard hand trajectory shape descriptor is calculated, the two cosine values are processed to obtain a common similarity of the movement descriptor and the hand trajectory shape descriptor to standard descriptors, and a standard gesture with a maximum common similarity is used as a gesture recognition result.

In this embodiment, the standard hand movement descriptor is obtained as follows: a trajectory shape expression is given, points are obtained on an analytic expression at a certain density, and the points are processed according to the method in Step 1-5 to obtain the standard hand movement descriptor and the standard hand trajectory shape descriptor. The standard hand movement descriptor of a circle obtained according to the expression $x^2+y^2=1$ is: [1;1;1;1;1;1;1;1], and the standard hand trajectory shape descriptor is: [1;1;1; 1;1;1;1;1]. The cosine value of the angle between the hand movement descriptor and the standard hand movement descriptor is 0.9755, and the cosine value of the angle between the hand trajectory shape descriptor and the standard hand trajectory shape descriptor is 0.9320.

In specific implementation, $\omega_1=0.5$, $\omega_2=0.5$. The common similarity of the movement descriptor and the trajectory shape descriptor to the standard descriptors is 0.9538.

The similarities of the movement descriptor and the trajectory shape descriptor obtained in Step 1-5 to other standard gesture descriptors are obtained, and a gesture with the maximum similarity is used as a gesture trajectory recognition result. In Table 4, the gesture descriptor is compared with standard gesture descriptors of a straight line and an S-shaped curve.

TABLE 4

| Gesture classes | circle | straight line | S-shape curve |
|---|---|---|---|
| Similarity | 0.9538 | 0.1812 | 0.4733 |

The trajectory recognition result is a circle.

As can be seen from the above embodiments, the present invention can accurately recognize the class of a gesture by processing data acquired by the kinect camera without training a great deal of samples, is insensitive to the translation, scaling, rotation and order of hand trajectories, is high in flexibility, can save a lot of time and energy, and is high in recognition speed and low in resource consumption.

What is claimed is:

1. A hand trajectory recognition method for a following robot based on hand velocity and trajectory distribution, comprising the following steps:

step 1: sampling and photographing an operator by a kinect camera to obtain three-dimensional positional information of skeleton joints, establishing a projection plane according to the three-dimensional positional information of the skeleton joints as well as relative positions of the operator and the kinect camera, photographing the operator by the kinect camera to obtain a hand three-dimensional position of a hand of the operator, recording movement data of the hand three-dimensional position in the process from a start sign gesture to an end sign gesture performed by the operator, and projecting the movement data of the three-dimensional position onto the projection plane to obtain hand projection plane data;

step 2: smoothing the hand projection plane data by moving average, connecting every two adjacent hand three-dimensional positions by a vector that points from a hand three-dimensional position of a former frame to a hand three-dimensional position of a latter frame, using the vectors as velocity vectors, classifying angles of the velocity vectors into n classes through a neighborhood method, and classifying magnitudes of the velocity vectors into m classes by size, wherein each said velocity vector is represented as follows:

$$(q,j), q \leq n, j \leq m \quad (1)$$

wherein, q is class results of the angles of the velocity vectors obtained through the neighborhood method, and j is class results of the magnitudes of the velocity vectors obtained by size;

step 3: processing angle classes and magnitude classes of the velocity vectors to obtain a hand movement vector, and cyclically shifting components in the hand movement vector to obtain a hand movement descriptor;

step 4: establishing a hand movement area around the hand according to the hand projection plane data, meshing the hand movement area, traversing hand three-dimensional positions of all frames in an order of sampling and photographing, assigning a mesh where the hand three-dimensional position of each frame is located, and calculating centroid positions of all assigned meshes;

step 5: establishing a vector from each said centroid position to the corresponding assigned mesh, and using the vector as a centroid directing vector; then, classifying angles and magnitudes of the centroid directing vectors in a same way as the velocity vectors in the step 2; then, processing angle classes and magnitude classes of the centroid directing vectors to obtain a hand shape vector, and cyclically shifting components in the hand shape vector to obtain a hand trajectory shape descriptor; and step 6: calculating a cosine value of an angle between the hand movement descriptor and a standard hand movement descriptor, calculating a cosine value of an angle between the hand trajectory shape descriptor and a standard hand trajectory shape descriptor, processing the two cosine values to obtain a common similarity of the movement descriptor and the hand trajectory shape descriptor to standard descriptors, and using a standard gesture with a maximum common similarity as a gesture recognition result.

2. The hand trajectory recognition method for a following robot based on hand velocity and trajectory distribution according to claim 1, wherein in the step 2, the movement data of the projected hand three-dimensional positions are smoothed by moving average specifically according to the following formula:

$$P'_i = \frac{P_{i-2} + P_{i-1} + P_i + P_{i+1} + P_{i+2}}{5}, 2 \leq i \leq N-2$$

$$P'_i = \frac{P_{i-1} + P_i + P_{i+1}}{3}, i = 1, N-1$$

$$P'_i = P_i, i = 0, N$$

wherein, $P_i$ is an i-th hand three-dimensional position, $P_i=(x_i, y_i)$, and $x_i$, $y_i$ are a horizontal coordinate and a vertical coordinate of the i-th hand three-dimensional position on the projection plane, respectively; $P_i'$ is an i-th hand three-dimensional position smoothed by moving average, $P_i'=(x_i', y_i')$, $x_i'$, $y_i'$ are a horizontal coordinate and a vertical coordinate of the i-th hand three-dimensional position, smoothed by moving average, on the projection plane, respectively, $i \leq N$, and N is the total number of hand three-dimensional positions obtained by sampling and photographing.

3. The hand trajectory recognition method for a following robot based on hand velocity and trajectory distribution according to claim 1, wherein in the step 3, processing the angle classes and the magnitude classes of the velocity vectors to obtain the hand movement vector is carried out as follows: magnitude classification results of velocity vectors with a same angle classification result are added, and the sum is used as an i-th component of the hand movement vector.

4. The hand trajectory recognition method for a following robot based on hand velocity and trajectory distribution according to claim 1, wherein mesh assignment in the step 4 specifically refers to processing the hand three-dimensional position of each frame as a current frame:

4.1: checking the hand three-dimensional positions of the current frame and a former frame; if the hand three-dimensional positions of the two frames are not located in a same mesh and the hand three-dimensional position of the former frame is not located within eight adjacent meshes of a mesh where the hand three-dimensional position of the current frame is located, connecting the hand three-dimensional positions of the two frame through a connecting segment, and assigning meshes where the connecting segment passes, specifically:

4.1.1: calculating a slope of the connecting segment between the hand three-dimensional positions of the two frames on the projection plane, obtaining a coordinate formula of the connecting segment, and assigning a mesh where the hand three-dimensional position of the former frame is located and the mesh where the three-dimensional position of the current frame is located;

4.1.2: from a mesh column where the hand three-dimensional position of the former frame is located, taking a column of meshes adjacent to the mesh, where the hand three-dimensional position of the current frame is located, as a first mesh column; from a mesh row, where the hand three-dimensional position of the former frame is located, to the mesh where the hand three-dimensional position of the current frame is located, assigning H meshes in the first mesh column, wherein H is an integer value obtained by rounding off the slope of the connecting segment;

4.1.3: then, from the first mesh column, taking a column of meshes close to the mesh, where the hand three-dimensional position of the current frame is located, as a next mesh column; from a mesh row where a mesh closest to the mesh, where the hand three-dimensional position of the current frame is located after assignment, to the mesh where the hand three-dimensional position of the current frame is located, assigning H' meshes in the next mesh column, wherein the value of H' is obtained as follows: coordinates of the mesh column closest to the mesh, where the hand three-dimensional position of the current frame is located after assignment, are substituted into a coordinate formula of the connecting segment to obtain a vertical coordinate; if a row coordinate is closer to the mesh, where the hand three-dimensional position of the current frame is located, than the vertical coordinate, H' is a maximum integer value smaller than the absolute value of the slope of the connecting segment; or, if the vertical coordinate is closer to the mesh, where the hand three-dimensional position of the current frame is located, than the row coordinate, H' is a minimum integer value greater than the absolute value of the slope of the connecting segment;

4.1.4: repeating the step 4.1.3 until the mesh, where the assigned mesh reaches the mesh where the hand three-dimensional position of the current frame is located; and 4.2: constructing a movement trajectory of a gesture center by all assigned meshes, and calculating centroid positions of all the assigned meshes.

5. The hand trajectory recognition method for a following robot based on hand velocity and trajectory distribution according to claim 1, wherein a method for processing the angle classes and the magnitude classes of the centroid directing vectors to obtain the hand shape vector in Step 5 is the same as the method of processing the angle classes and the magnitude classes of the velocity vectors to obtain the hand movement vector in the step 3.

6. The hand trajectory recognition method for a following robot based on hand velocity and trajectory distribution according to claim 1, wherein in the step 6, the common similarity of the movement descriptor and the trajectory shape descriptor to the standard descriptors is calculated according to the following formula:

$$S_0 = \omega_1 S_1 + \omega_2 S_2$$

wherein, $S_1$ is the similarity of the movement descriptor to the standard descriptor, $S_2$ is the similarity of the trajectory shape descriptor to the standard descriptor, $S_0$ is the common similarity of the movement descriptor and the trajectory shape descriptor to the standard descriptor, $\omega_1$ is the weight of the similarity of the movement descriptor to the standard descriptor in the common similarity of the movement descriptor and the trajectory shape descriptor to the standard descriptor, and $\omega_2$ is the weight of the similarity of the trajectory shape descriptor to the standard descriptor in the common similarity of the movement descriptor and the trajectory shape descriptor to the standard descriptor.

* * * * *